United States Patent
Griesemer

(10) Patent No.: US 6,467,037 B1
(45) Date of Patent: *Oct. 15, 2002

(54) UTILIZING A PROGRAM COUNTER WITH ONE OR MORE DATA COUNTERS FOR EXECUTING INSTRUCTIONS

(75) Inventor: Robert Griesemer, Menlo Park, CA (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 30 days.

(21) Appl. No.: 09/107,939

(22) Filed: Jun. 30, 1998

(51) Int. Cl.[7] .................................. G06F 9/30
(52) U.S. Cl. ...................................... 712/205
(58) Field of Search ............................ 712/205, 208, 712/214

(56) References Cited

U.S. PATENT DOCUMENTS

| | | | |
|---|---|---|---|
| 4,086,626 A | * | 4/1978 | Chung et al. ............... 712/244 |
| 4,267,581 A | | 5/1981 | Kobayashi et al. |
| 4,403,310 A | | 9/1983 | Minami |
| 4,689,738 A | * | 8/1987 | Wijk et al. .................... 712/36 |
| 5,185,873 A | * | 2/1993 | Maejima et al. ............. 712/201 |
| 5,274,775 A | * | 12/1993 | Croson ........................ 712/32 |
| 6,012,138 A | * | 1/2000 | Worrell ....................... 712/209 |

FOREIGN PATENT DOCUMENTS

| | | |
|---|---|---|
| EP | 0 328 422 A2 | 8/1989 |
| EP | 0897146 A2 | 2/1999 |
| EP | 0917048 A2 | 5/1999 |

* cited by examiner

Primary Examiner—David Y. Eng
(74) Attorney, Agent, or Firm—Beyer Weaver & Thomas LLP

(57) ABSTRACT

Methods and systems for executing instructions utilizing a program counter with one or more data counters are provided. A program counter specifies an instruction in an instruction section to be executed by the computer. A data counter specifies a data location in a data section that includes information to be utilized when the instruction specified by the program counter is executed. By utilizing both a program counter and a data counter, instructions can be efficiently executed without unnecessarily wasting memory space and without wasting time to access data that is not aligned.

14 Claims, 13 Drawing Sheets

UTILIZING A PROGRAM COUNTER WITH ONE OR MORE DATA COUNTERS FOR EXECUTING INSTRUCTIONS

BACKGROUND OF THE INVENTION

The present invention relates to executing instructions utilizing a program counter and a data counter. More specifically, the invention relates to executing virtual machine instructions utilizing a program counter with one or more data counters that refer to data values stored in a data section that are associated with virtual machine instructions specified by the program counter.

Instructions that are executed by computers often have a standard format: an operation code (opcode) followed by zero or more operands. The opcode specifies the operation that the computer is to perform and the optional operands specify data that are associated with the operation. For example, the opcode can instruct the computer to push a value on the stack and the operand can specify the data value to be pushed on the stack. The operands can specify data in a variety of forms including data values, addresses, and the like.

FIG. 1 shows a traditional instruction section including instructions for computer execution. An instruction section 101 includes multiple instructions for computer execution. An instruction 103 consists of an opcode 105 and no operands. As shown, an instruction 107 consists of an opcode 109 and an operand (e.g., data value) 111. An instruction 113 consists of an opcode 115 and an operand 117. Instructions can also include multiple operands (not shown).

Typically, all of the opcodes have the same length. However, it is common for the operands to be of varying lengths. For example, the opcodes shown in FIG. 1 can be a single byte long. operand 111 can be a two-byte data value (e.g., 16-bit value) and operand 117 can be a four-byte data value (e.g., 32-bit value).

When a computer accesses data from memory, it is usually more efficient if the data is aligned. The alignment depends on the data size (e.g., an n-bit data value usually should be n-bit aligned). Generally, access is most efficient if the data is aligned on a word boundary. As an example, if a computer is able to access aligned 32-bit values in a single operation, there will be a significant performance increase if the 32-bit data values are aligned on word boundaries. The 32-bit data values that are not aligned can require multiple read operations and operations to assemble the component parts of the desired data value. For example, many reduced instruction set computing (RISC) computers cannot read data that is not aligned in one instruction, but must use several instructions.

There have been attempts to ensure that data values are aligned. FIG. 2 shows an instruction and data section that has been utilized in Smalltalk 80. An instruction section 151 includes opcodes and indices. The indices specify data values in a data section 153. As shown, an opcode 155 is followed by an index 157 and index 157 specifies a data value 159 in data section 153.

Accordingly, when an opcode requires a data value, the opcode is followed by an index that specifies a data value in a data section. Because the data values are stored together in a data section, the data section can be aligned so that the data values can be more efficiently read by the computer. Although this solution has been successful for some applications, disadvantages include that following the index (i.e., adding the index to a pointer) is an additional burden that can create slower run time performance and the size of the program is larger because of the space occupied by the indices.

Another solution has been to align data values within the instruction section. FIG. 3 shows an instruction section where the data values are aligned. An instruction section 201 includes opcodes and any associated data values. When an opcode requires one or more data values, the data values are aligned following the opcode. For example, an opcode 203 requires two data values 205 and 207. If the data location following opcode 203 is not aligned, a null space 209 is utilized so that data values 205 and 207 are aligned.

The contents of null space 209 is generally unimportant (although it is typically zeroed out) as when the computer is executing opcode 203, the computer determines that the data location following the opcode is not aligned so the computer skips the null space and retrieves data values 205 and 207 at aligned data locations. Although t his solution has proved successful in some applications, the size of the program is increased due to the null spaces.

There is a need for innovative methods and systems that provide encoding schemes for instruction sets that allow both efficient decoding of the opcodes and fast access to operands of different sizes.

SUMMARY OF THE INVENTION

Embodiments of the present invention provide methods and systems for utilizing a program counter with one or more data counters for executing instructions. The program counter specifies the opcode in the instruction section that is being executed by the computer. A data counter is utilized to specify a data location in a data section that can be associated with the opcode specified by the program counter. Accordingly, the data counter generally mirrors the movement of the program counter and allows the computer to easily access information stored in the data section. Several embodiments of the invention are described below.

In one embodiment, the invention provides a method of executing instructions. A program counter specifies an instruction in an instruction section for execution. Additionally, a data counter specifies a data location in a data section for use with the instruction. After the instruction specified by the program counter has been executed, the program counter can be incremented to a next instruction. The computer system can also determine if the data location specified by the data counter was for use with the instruction and if it was, the data counter can be incremented to a next data location.

In another embodiment, the invention provides a data structure stored by a computer readable medium for executing instructions. The computer readable medium stores an instruction section that includes multiple instructions and a data section that includes multiple data locations, each of the data locations being for use with one of the instructions. A program counter specifies an instruction in the instruction section and a data counter specifies a data location in the data section, where the data location can be use with the instructions specified by the program counter during execution.

Other features and advantages of the invention will become readily apparent upon review of the following description in association with the accompanying drawings.

DETAILED DESCRIPTION OF PREFERRED EMBODIMENTS

In the description that follows, the present invention will be described in reference to examples where the opcodes are one byte long and data values are two or four bytes long. Although the sizes can be fairly typical, the invention can be advantageously applied to opcodes and data values of any length. Additionally, the invention is not limited to any particular language, computer architecture or specific implementation. Therefore, the description of the embodiments that follows is for purposes of illustration and not limitation.

Figures 1, 2:
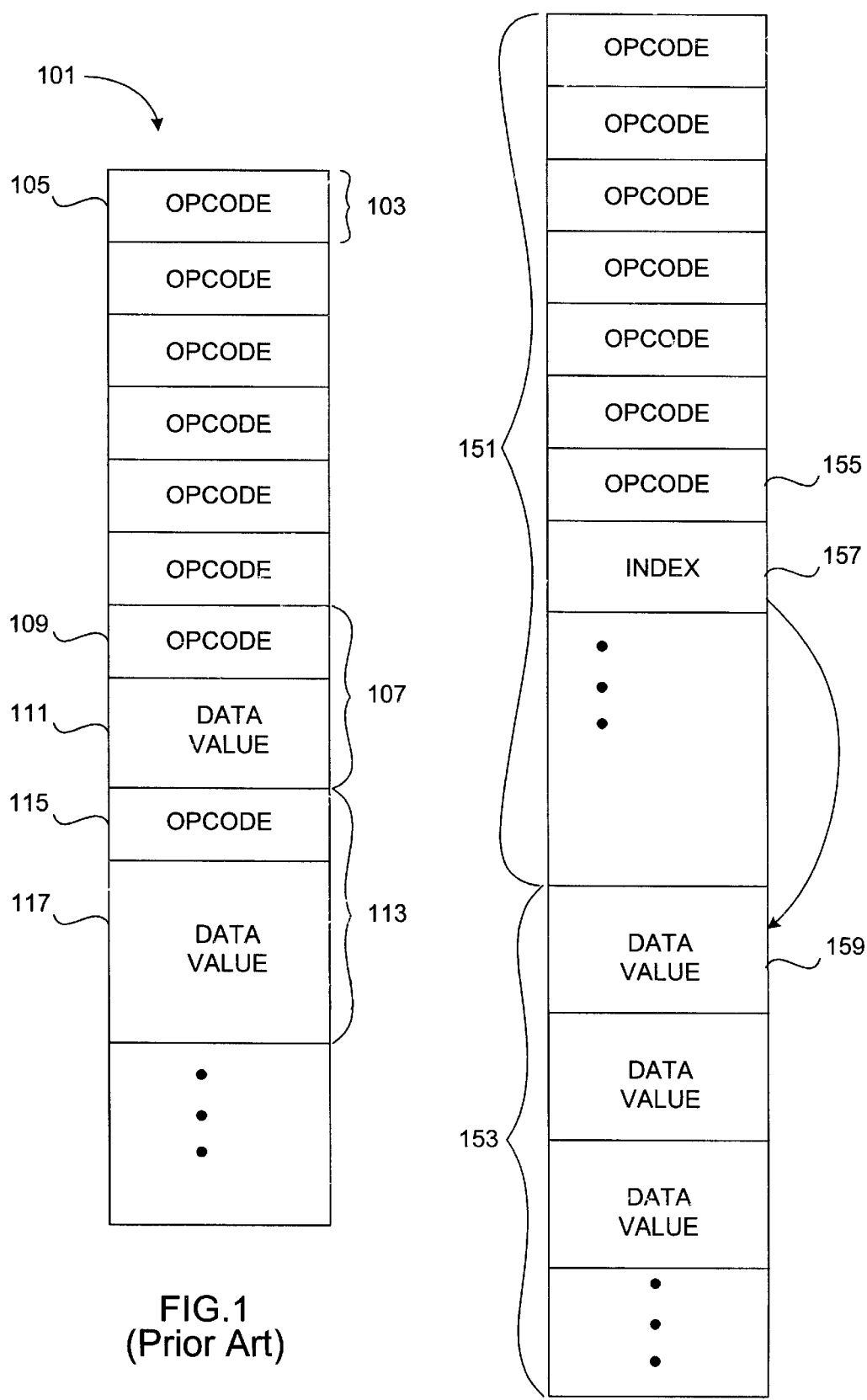
FIG. 1 shows an instruction section including opcodes and data values.
FIG. 2 shows an instruction section that includes indices that reference data values in a data section.
Figure 3:
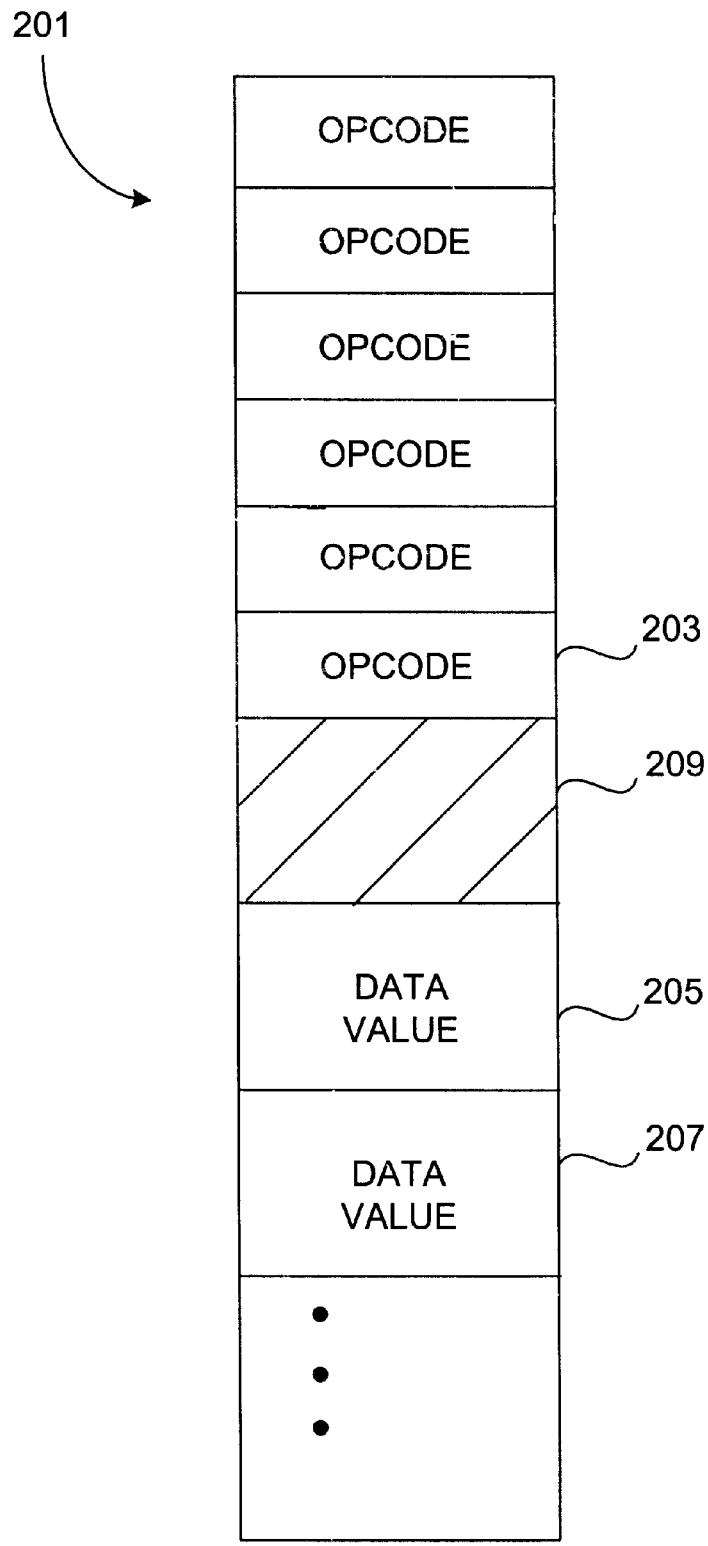
FIG. 3 shows an instruction section that includes null spaces following opcodes to make the data values aligned.
Figure 4:
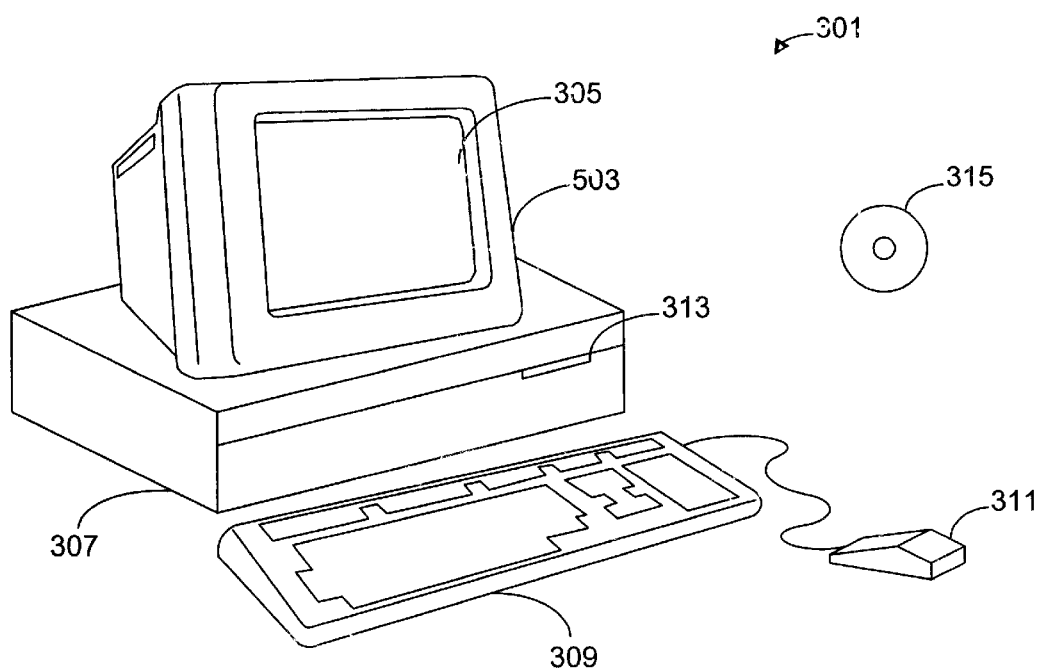
FIG. 4 illustrates an example of a computer system that can be utilized to execute the software of an embodiment of the invention.

FIG. 4 illustrates an example of a computer system that can be used to execute the software of an embodiment of the invention. FIG. 4 shows a computer system 301 that includes a display 303, screen 305, cabinet 307, keyboard 309, and mouse 311. Mouse 311 can have one or more buttons for interacting with a graphical user interface. Cabinet 307 houses a CD-ROM drive 313, system memory and a hard drive (see FIG. 6) which can be utilized to store and retrieve software programs incorporating computer code that implements the invention, data for use with the invention, and the like. Although CD-ROM 315 is shown as an exemplary computer readable storage medium, other computer readable storage media including floppy disk, tape, flash memory, system memory, and hard drive can be utilized. Additionally, a data signal embodied in a carrier wave (e.g., in a network including the Internet) can be the computer readable storage medium.

Figure 5:
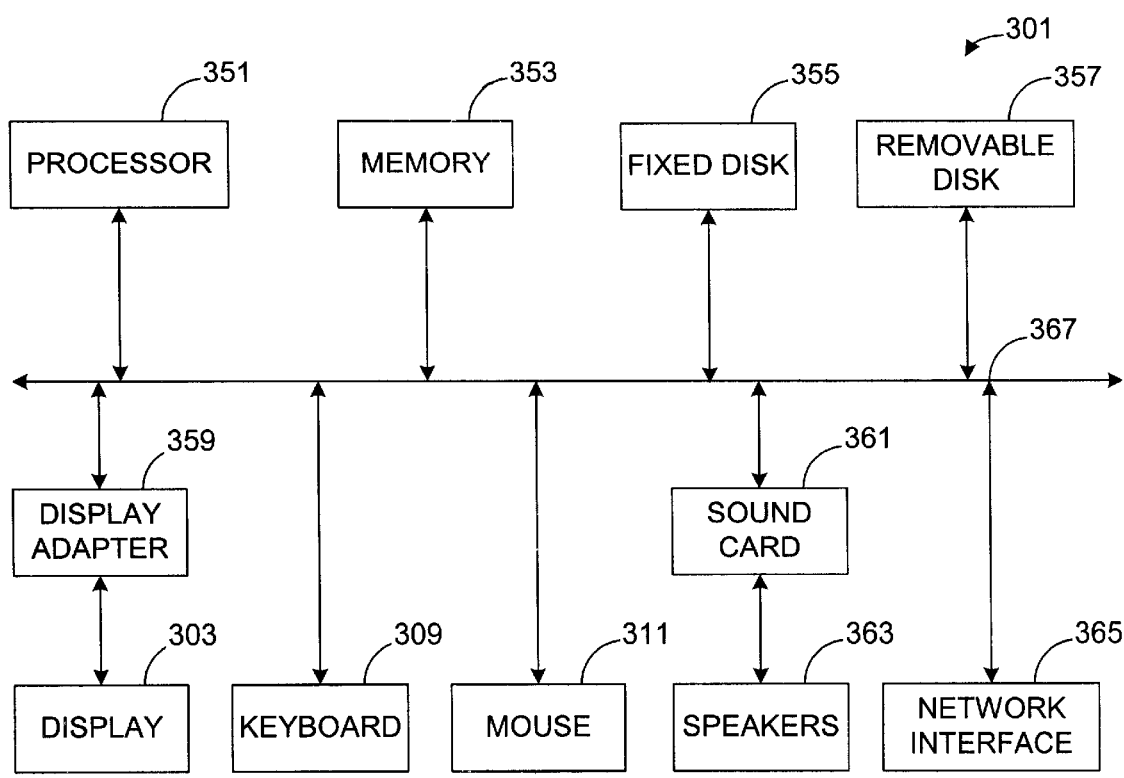
FIG. 5 illustrates a system block diagram of the computer system of FIG. 4.

FIG. 5 shows a system block diagram of computer system 301 used to execute the software of an embodiment of the invention. As in FIG. 4, computer system 301 includes monitor 303 and keyboard 309, and mouse 311. Computer system 301 further includes subsystems such as a central processor 351, system memory 353, fixed storage 355 (e.g., hard drive), removable storage 57 (e.g., CD-ROM drive), display adapter 359, sound card 361, speakers 363, and network interface 365. Other computer systems suitable for use with the invention can include additional or fewer subsystems. For example, another computer system could include more than one processor 351 (i.e., a multi-processor system) or a cache memory.

The system bus architecture of computer system 301 is represented by arrows 367. However, these arrows are illustrative of any interconnection scheme serving to link the subsystems. For example, a local bus could be utilized to connect the central processor to the system memory and display adapter. Computer system 301 shown in FIG. 5 is but an example of a computer system suitable for use with the invention. Other computer architectures having different configurations of subsystems can also be utilized.

When used herein the term "instruction section" will be utilized to refer to a section of memory that includes one or more opcodes. The instruction section can also include data values addresses or indices depending upon the specific application. In general, the instruction section is an area of memory that is accessible through a program counter. The term "data section" will be utilized to refer to a section of memory that can store data values, cache information, and the like depending on the specific application. The data section is accessible through a data counter.

Figure 6:
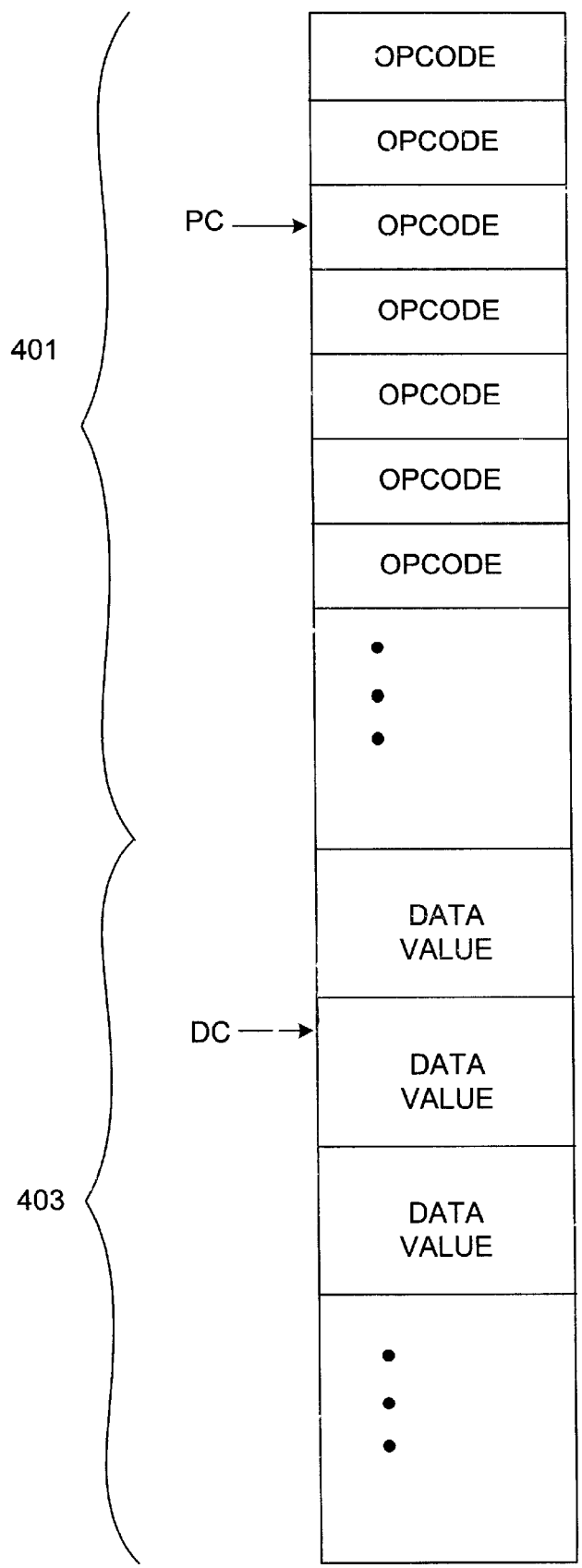
FIG. 6 shows a program counter that specifies an opcode in an instruction section and a data counter that specifies a data value in a data section.

FIG. 6 shows a program counter that specifies an opcode in an instruction section and a data counter that specifies a data value in a data section. The data value can be for use by the computer system when an opcode in the instruction section is being executed. An instruction section 401 includes multiple opcodes and a data section 403 includes multiple data values. A program counter PC specifies an opcode in instruction section 401 for execution by the computer system. Similarly, a data counter DC specifies a data value in a data section that can be utilized by the computer system during execution of the opcode specified by the PC.

By moving the data values into a data section, the data values can be aligned for more efficient access by the computer system. Additionally, since a data counter is utilized to access data values at specific data locations in the data section, memory space is not wasted storing indices or null spaces in order to achieve this alignment. Although FIG. 6 shows data values stored in the data section, other types of information can be stored in the data section including cache information as will be described in reference to FIGS. 12–14. Additionally, it should be understood that there is no requirement that the instruction and data sections be contiguous or in fact be stored in the same computer readable medium (see, e.g., FIG. 14).

Figure 7:
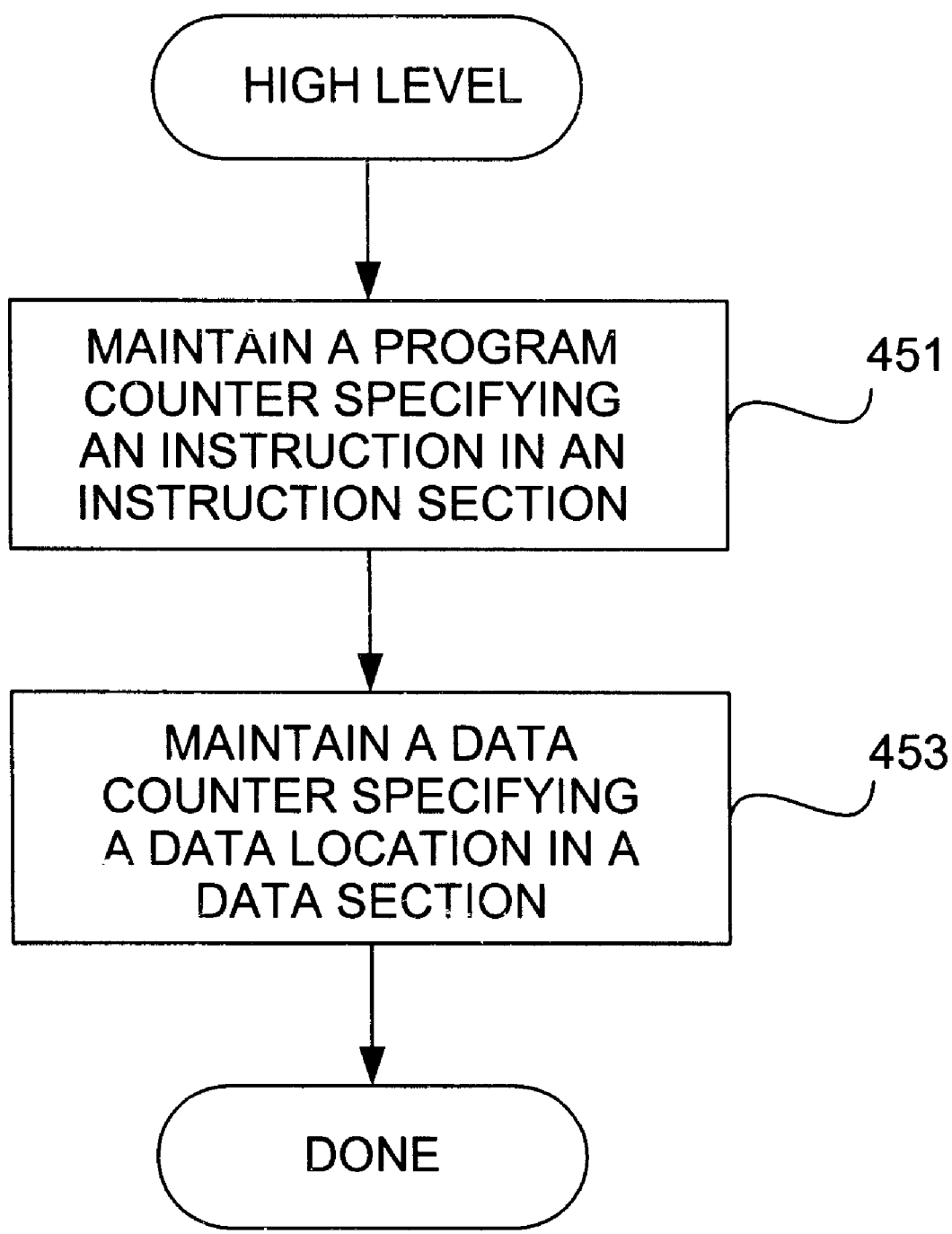
FIG. 7 shows a high level flow chart of a process of maintaining a program counter and a data counter.

Now that a general structure of an instruction section and a data section has been described, FIG. 7 shows a high level flow chart of a process of maintaining a program counter and a data counter that reference these sections. At a step 451, the computer system maintains a program counter that specifies an instruction in an instruction section. The computer system also maintains a data counter that specifies a data location in a data section at a step 453. The data location can include data values or cache information for use with the instruction specified by the program counter during execution. Although the steps in the flow chart described herein are shown in a specific order, no order should be implied by the order in which the steps are described. For example, the steps can be reordered, combined and even deleted in specific applications. Additionally, the steps can be executed in parallel.

Figure 8:
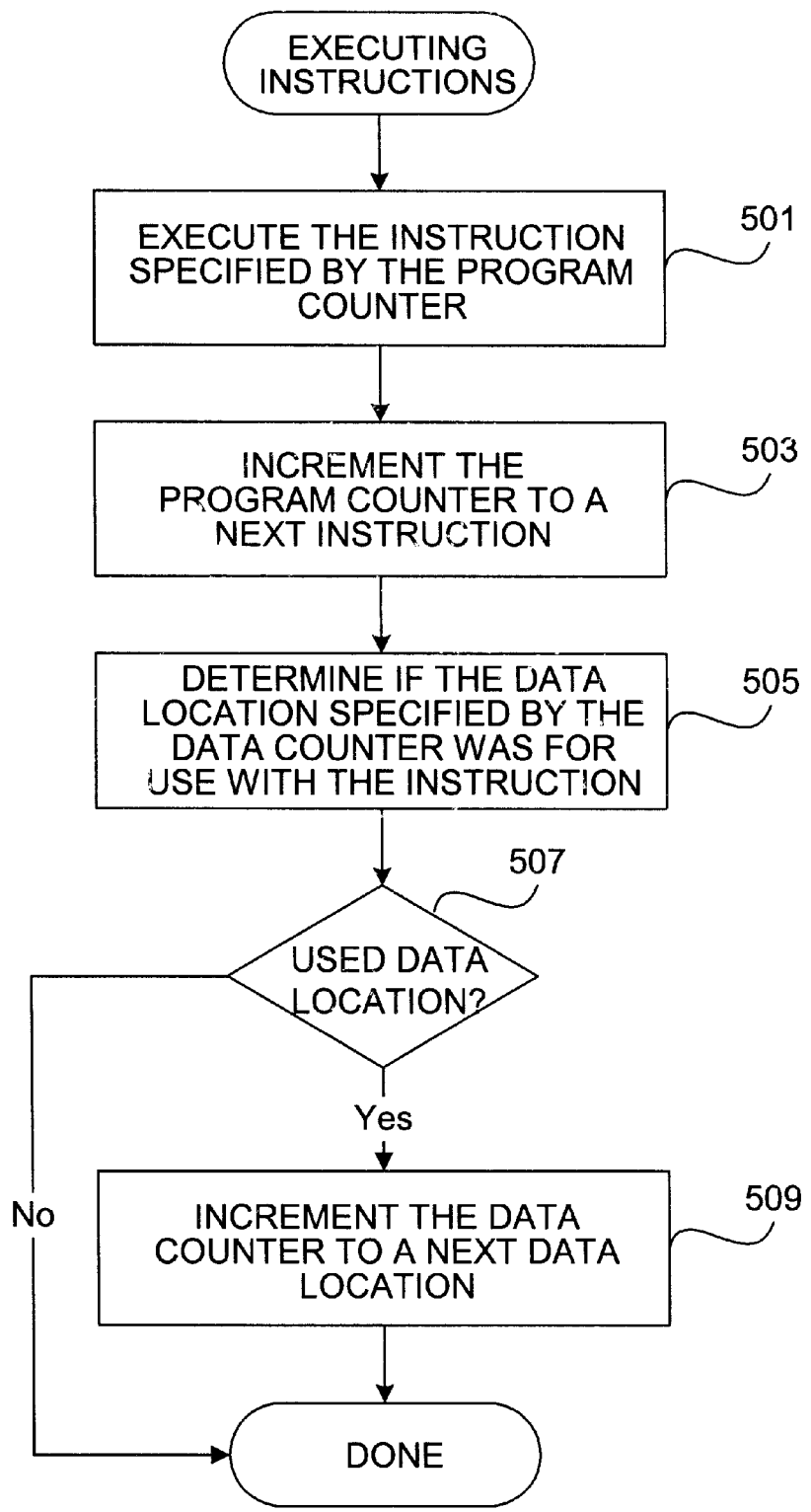
FIG. 8 shows a flow chart of a process of executing instructions utilizing a program counter and a data counter.

FIG. 8 shows a flow chart of a process of executing instructions utilizing a program counter and a data counter. At a step 501, the computer system executes the instruction specified by the program counter. After executing the instruction, the computer system increments the program counter to a next instruction at a step 503. The next instruction is the instruction that will generally be executed next by the computer system unless there is a branch or jump to another location.

At a step 505, the computer system determines if the data location specified by the data counter was for use with the instruction. As described above, the data counter specifies a data location in the data section. The computer system determines if the information at the data location specified by the data counter was used during execution of the instructions specified by the program counter. For example, if the instruction was an operation to store a data value, the associated data value can have been stored in the data section and specified by the data counter.

If the data location specified by the data counter was for use with the instruction at a step 507, the computer system increments the data counter to a next data location at a step 509. The computer system increments the data counter to refer to the next aligned data location. Otherwise, the data counter is not incremented as the data location specified by the data counter was not for use with the instruction.

Figure 9:
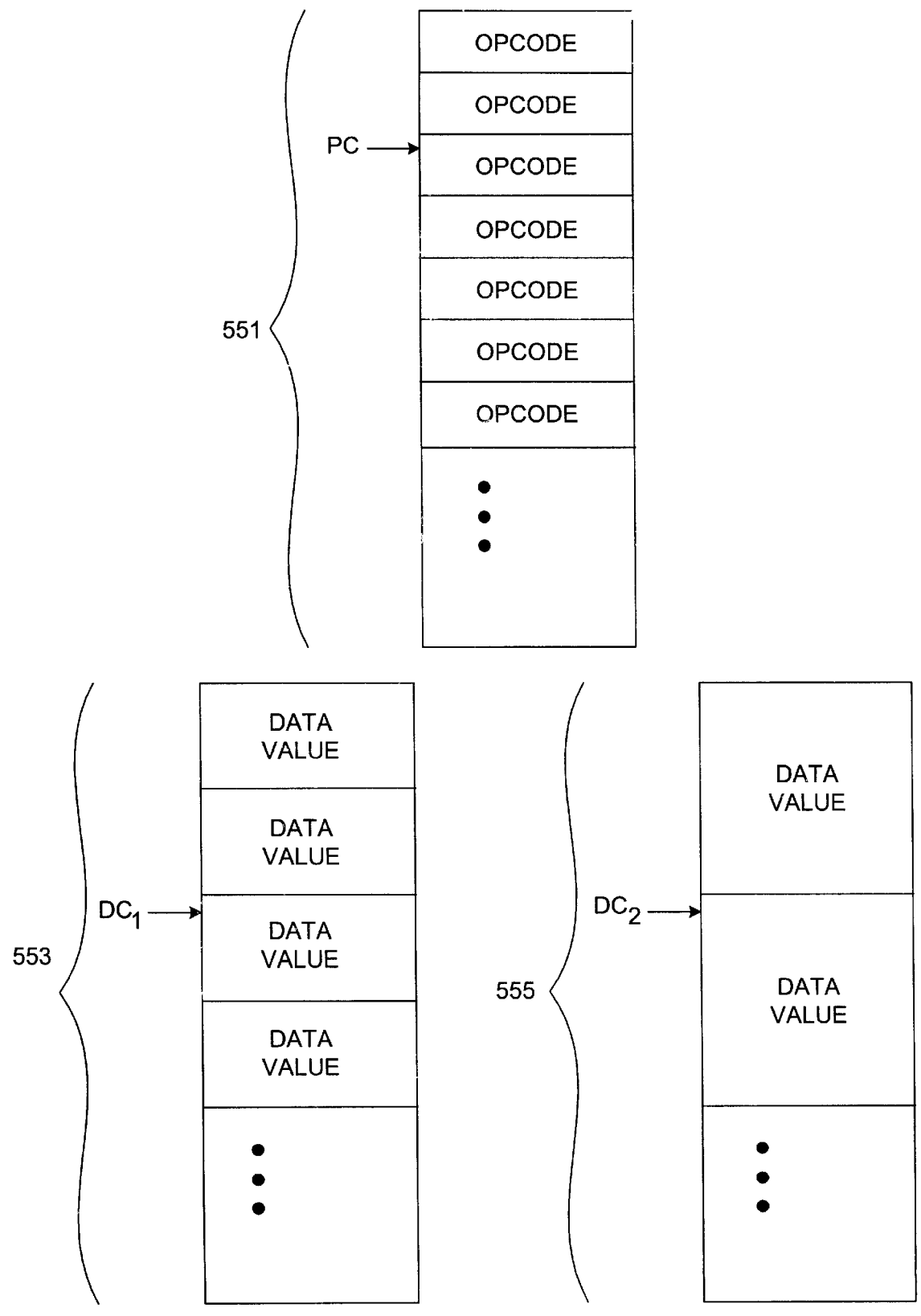
FIG. 9 shows a program counter than specifies an opcode in an instruction section and multiple data counters that specify data values of varying sizes in data sections.

In general, it can be best with some instruction sets if the data values stored in the data section are all of the same size. However, multiple data sections can be utilized to store data values of various sizes. FIG. 9 shows multiple data sections each storing data values of a different size. As shown, an instruction section 551 includes multiple opcodes. An opcode is specified by a program counter PC for execution.

A data section 553 includes multiple data values of a first size. A data value is specified by a data counter $DC_1$ that can be associated with an opcode in instruction section 551. A data section 555 includes multiple data values of a second size. A data value in data section 555 is specified by a data counter $DC_2$ for use with an opcode in instruction section 551. As an example, the data values in data section 553 can be two bytes long and the data values stored in data section 555 can be four bytes long. Depending on the opcode, the computer system utilizes the appropriate data value in the data sections and increments the data counter accordingly.

With some instruction sets, it can be beneficial to store data values in the data section that are multiples of a common size. For example, if an instruction set provides for data values that are 32-bits, 64-bits and 128-bits long, but does not provide instructions for reading 64-bit and 128-bit data values with one instruction, all the data values may be stored in a data section that is 32-bit aligned. In such an embodiment, the data counter is incremented according to the size of the data value as indicated by the instruction.

Figure 10:
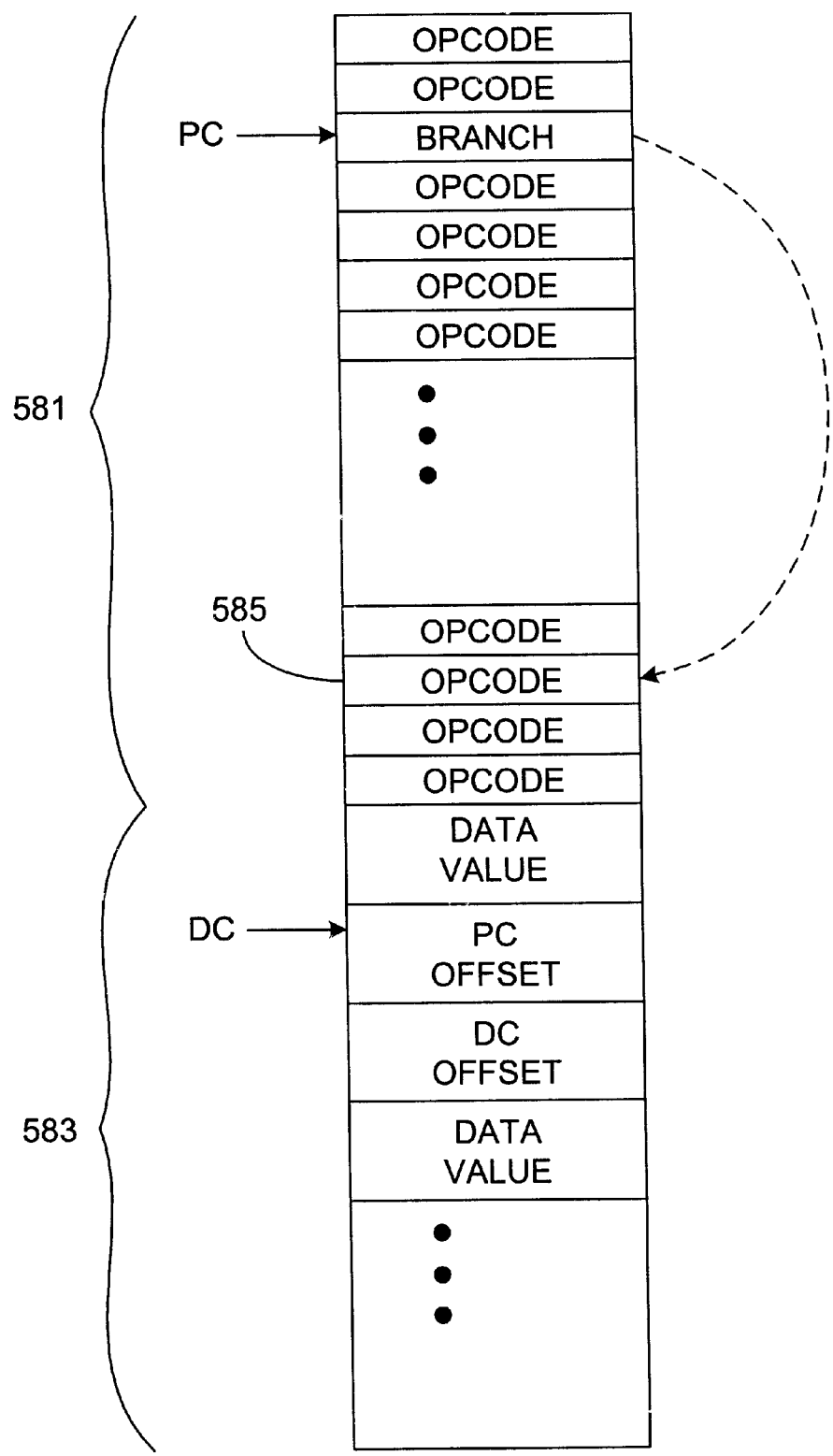
FIG. 10 shows how a branch instruction is implemented with a data counter and data section in one embodiment.

Various techniques can be utilized to maintain the one or more data counters. As described above, a data counter can be incremented after it is determined that the data location specified by the data counter was used with an executed opcode. When the program counter branches or jumps to another location, the data counter should also jump to the data location that is associated with that instruction. FIG. 10 shows one embodiment in which a branch instruction is implemented with a data counter and data section.

An instruction section 581 includes multiple opcodes as shown. The instructions are shown without data values in instruction section 581; however, other embodiments may include data values in the instruction that are associated with instructions. A data section 583 includes multiple data values. A program counter PC specifies an opcode that is a branch instruction. The branch instruction specified by the PC, along with other information associated with the branch instruction, instructs the computer system to next execute an opcode 585 (as indicated by the dashed arrow).

The destination of a branch instruction may be specified a number of different ways that are known in the art. As an example, an address may follow the branch instruction that is the destination address of the branch. Additionally, an offset may follow the branch instruction that, when added to the PC, specifies the address of the branch. FIG. 10 shows that the PC offset following the branch instruction may be stored in data section 583. The data section may also store a DC offset that, when added to the DC, specifies the destination address for the DC after the branch.

During operation, the computer system executes the branch instruction specified by the PC by reading in the PC offset specified by the DC. The PC offset is added to the PC so that the PC points to the destination of the branch. Additionally, the computer system reads in the DC offset in the data section after incrementing the DC. The DC offset is added to the DC so that the movement of the DC mirrors the movement of the PC. The PC and DC offsets will typically not be identical as there can be variations in the number of data values (if any) that are associated with each instruction. Although FIG. 10 has been described in reference to using offsets for branch instructions, the same techniques may be advantageously applied to other instruction formats including those that utilize destination addresses.

Figure 11:
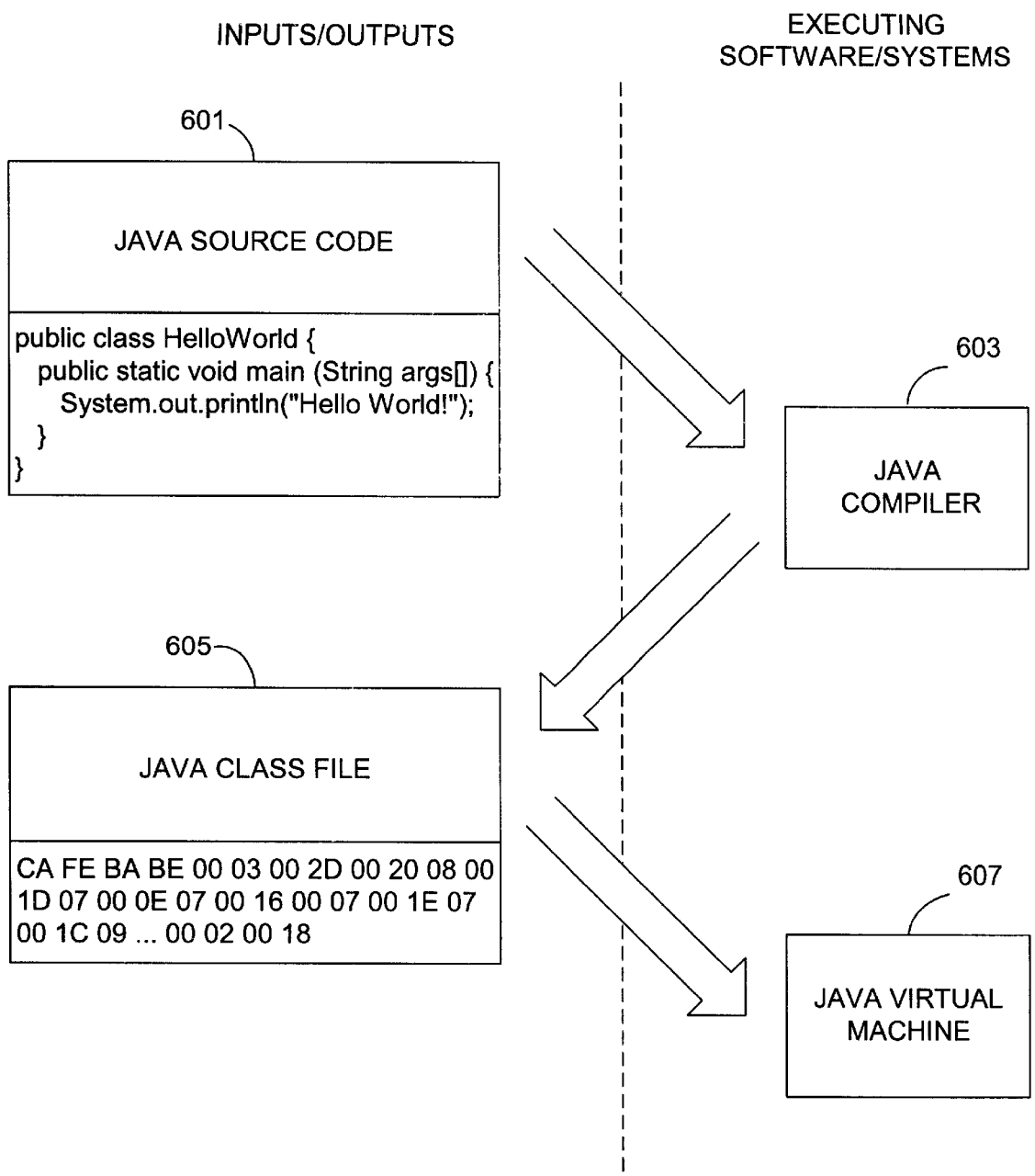
FIG. 11 illustrates how a Java™ source code program is executed.

Preferred embodiments of the invention are utilized to enhance the performance of a Java™ virtual machine. A Java™ virtual machine executes virtual machine instructions that are stored in class files. FIG. 11 shows a progression of a piece of Java™ source code through execution by a Java™ virtual machine.

Java source code 601 includes the classic "Hello World" program written in Java. The source code is then input into a Java compiler 603 for the Java programming language that compiles the source code into virtual machine instructions. The virtual machine instructions will be executed by a virtual machine. Typically, virtual machine instructions are generic (i.e., not designed for any specific computer architecture or microprocessor) but this is not required. The Java compiler outputs a Java class file 605 that includes the virtual machine instructions for the Java program.

The Java class file is input into a Java virtual machine 607. The Java virtual machine decodes and executes the virtual machine instructions in the Java class file. The Java virtual machine is typically an interpreter, but is still referred to as a virtual machine as it emulates a computer architecture or microprocessor in software (e.g., the microprocessor or computer architecture that can not exist in hardware).

Figure 12:
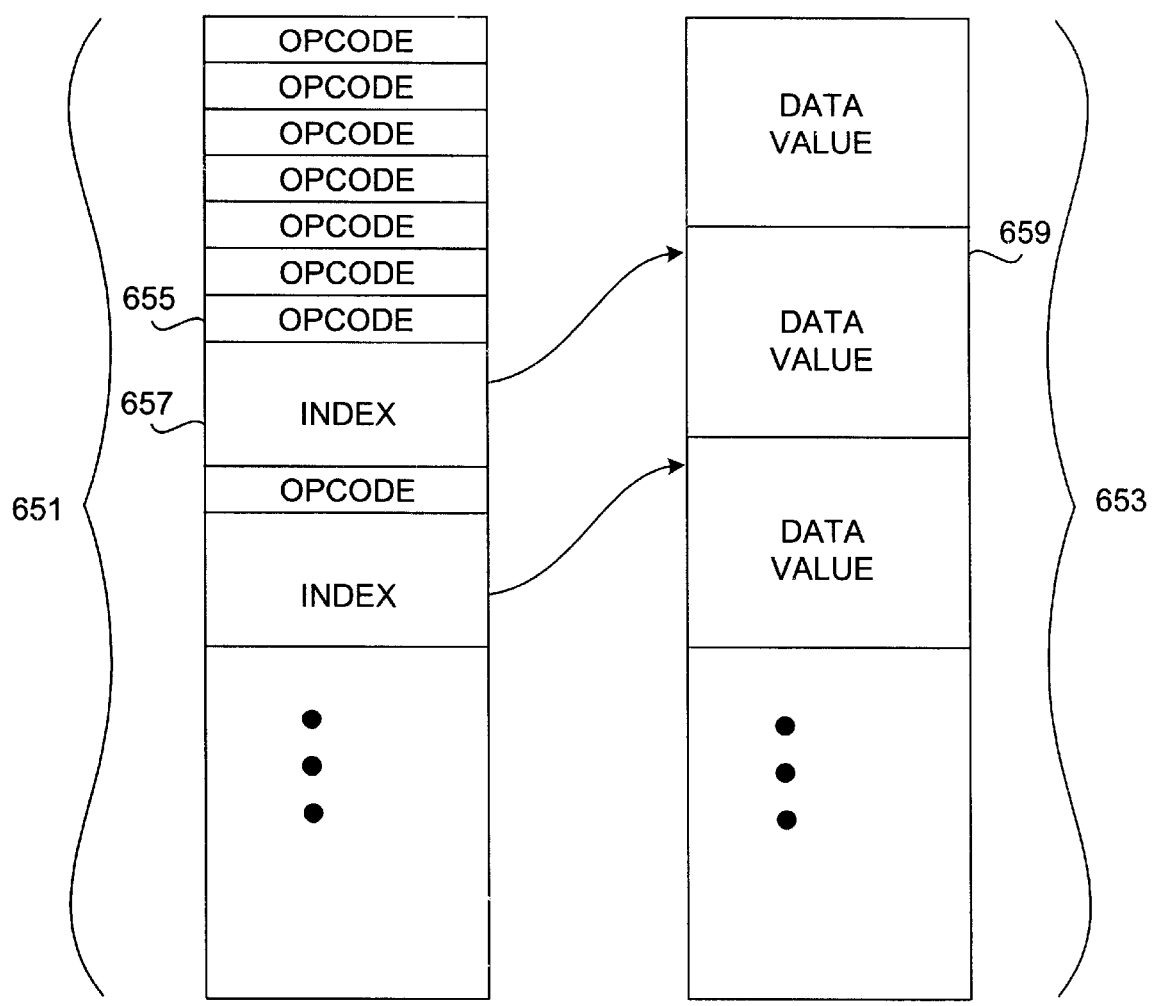
FIG. 12 shows an instruction section that includes indices into a constant pool in a Java™ virtual machine.

FIG. 12 shows an instruction section and constant pool that can be utilized during program execution by a Java virtual machine. An instruction section 651 includes multiple opcodes. The opcodes can utilize data values that are stored in a constant pool 653. In order to reference the data values, an index is stored after an opcode that specifies a data value in constant pool 653.

As an example, an opcode 655 requires or manipulates a data value so opcode 655 is followed by an index 657. Index 657 specifies a data value 659 in constant pool 653. In conventional Java virtual machines, the opcode is one byte, the index is two bytes long and the data values are four byte quantities.

Figure 13:
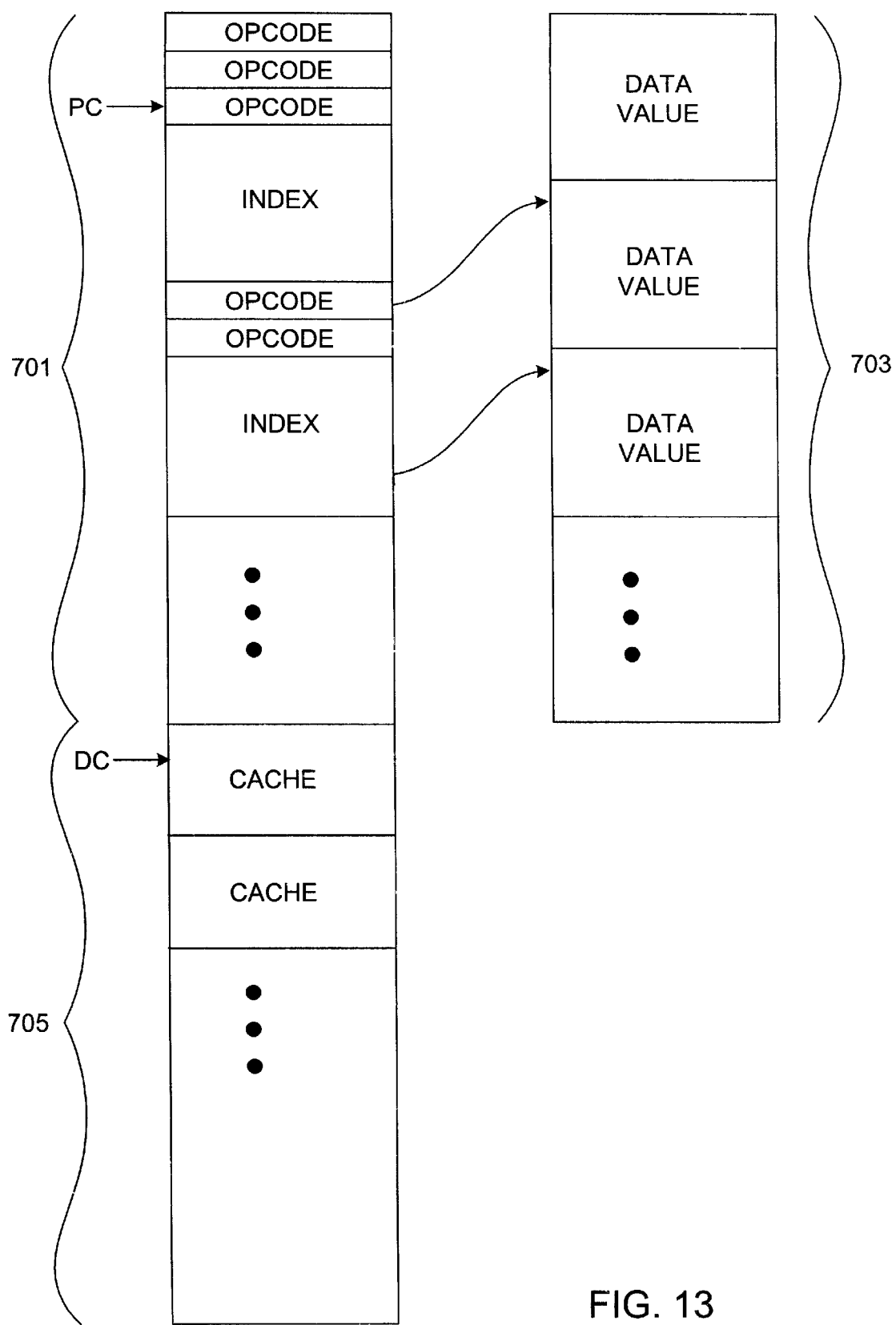
FIG. 13 shows a program counter that specifies an opcode in an instruction section and a data counter that specifies cache information for the opcode in a data section.

The present invention can be utilized to store cache information regarding opcodes. FIG. 13 shows a data section that stores cache information regarding opcodes that are being executed by the computer system. An instruction section 701 includes multiple opcodes and indices as described in reference to FIG. 12. Similarly, a data section 703 includes multiple data values that are specified by the indices in instruction section 701. A program counter PC specifies an opcode to be executed in the instruction section.

A data section 705 includes multiple data locations storing cache information to enhance execution performance of the opcodes. A data counter DC specifies a data location that includes cache information. As an example of the cache information, an invoke_virtual opcode instructs the computer system to call a virtual function. The determination of the function to be invoked is made dynamically at runtime.

The class and method that was last invoked by the invoke_virtual opcode can be stored in the data location specified by data counter DC. Accordingly, during subsequent execution of the opcode, the computer system can access the cache information specified by the data counter to more efficiently determine the appropriate method or function to invoke.

Figure 14:
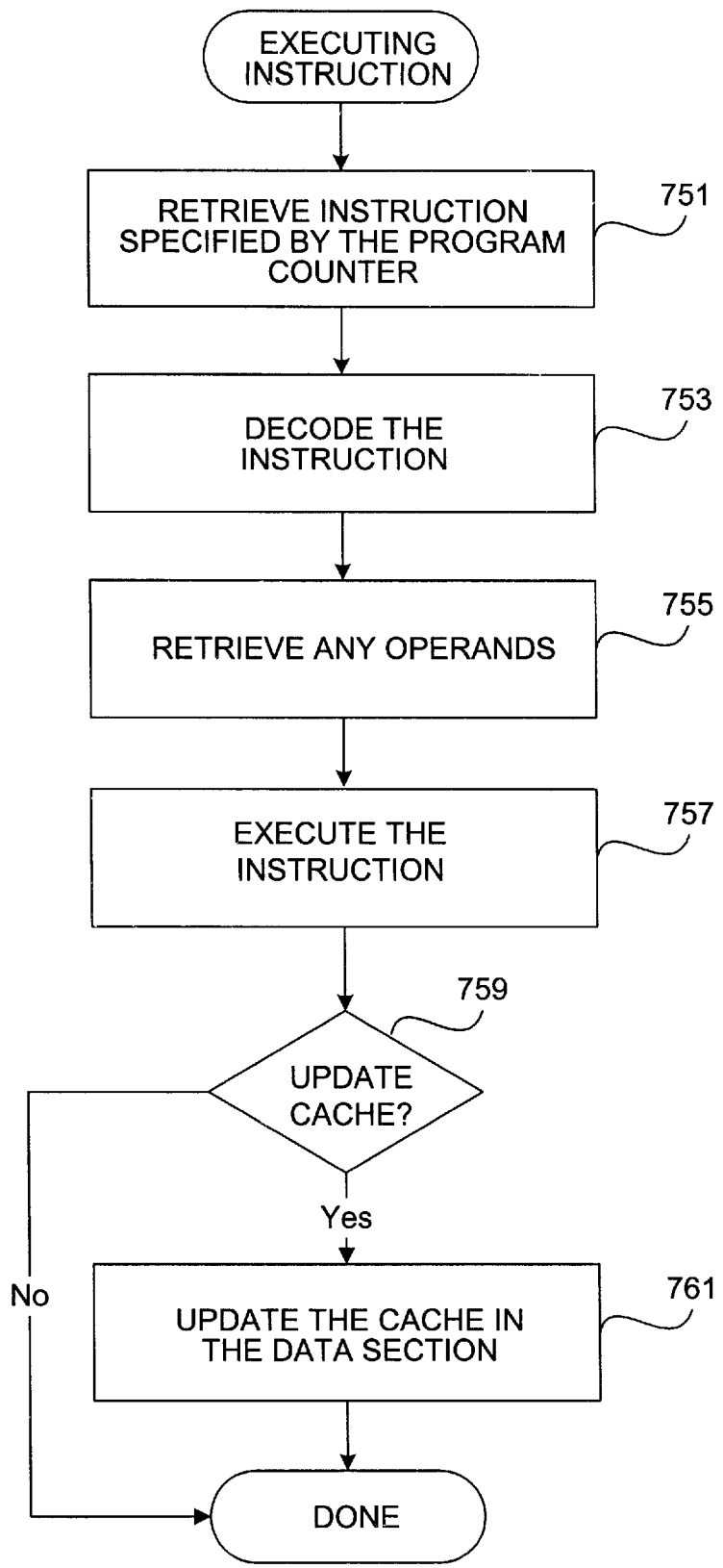
FIG. 14 shows a flow chart of a process of executing an instruction so that the cache in the data section is updated.

FIG. 14 shows a flow chart of a process of executing an instruction that illustrates how a cache in the data section can be updated. At a step 751, the computer system retrieves an instruction specified by the program counter. The computer system then decodes the instruction at a step 753. Depending on the instruction, the computer system can need to retrieve operands at a step 755. As described above, the operands can be obtained by referencing an index in the instruction section to access a data value stored in a constant pool.

At a step 757, the computer system executes the instruction specified by the program counter. Execution of the instruction can include the steps of accessing cache information in the data section specified by the data counter. Once the cache information is accessed, the computer system will generally determine if the cache information is still current at a step 759. If it is not current, the computer system will refresh or update the cache information at a step 761. The computer system can update the cache in the data section by storing the new cache information at the data location specified by the data counter. For illustration purposes, steps 757, 759 and 761 are shown as separate sequential steps. In a preferred embodiment, these steps are performed together. For example, in order to execute the instruction, the computer system read the instruction, update the cache information in the data section and execute the instruction. Therefore, there is no requirement that the steps are performed as isolated events.

The cache information may also be arguments to a recently called function with the results of the function call. If the results of the function call is definite in view of the arguments, the cache information can store the arguments and results for one or more of the calls. For example, if a function returns the sin value of a passed angle, the cache information could store the last angle and result so that if the next call is the same, the call to the sin function can be skipped, thereby increasing execution speed. More than one set of argument list/result can be stored in the cache information (e.g., for a factorial function). Additionally, the result of a function that takes no arguments can also be stored in the cache information.

By utilizing the cache information stored in the data section, the computer system can more efficiently execute the instructions in the instruction section. There is no requirement that the instruction section, constant pool or data section be in any specific location. It is preferable if the constant pool and data section are stored together in the same area of memory. In order to utilize the invention with some existing Java virtual machines, the above embodiments can require that the virtual machine be changed. The following describes how the invention can be utilized in such a virtual machine as an add-on to improve performance without re-engineering the virtual machine.

Figure 15:
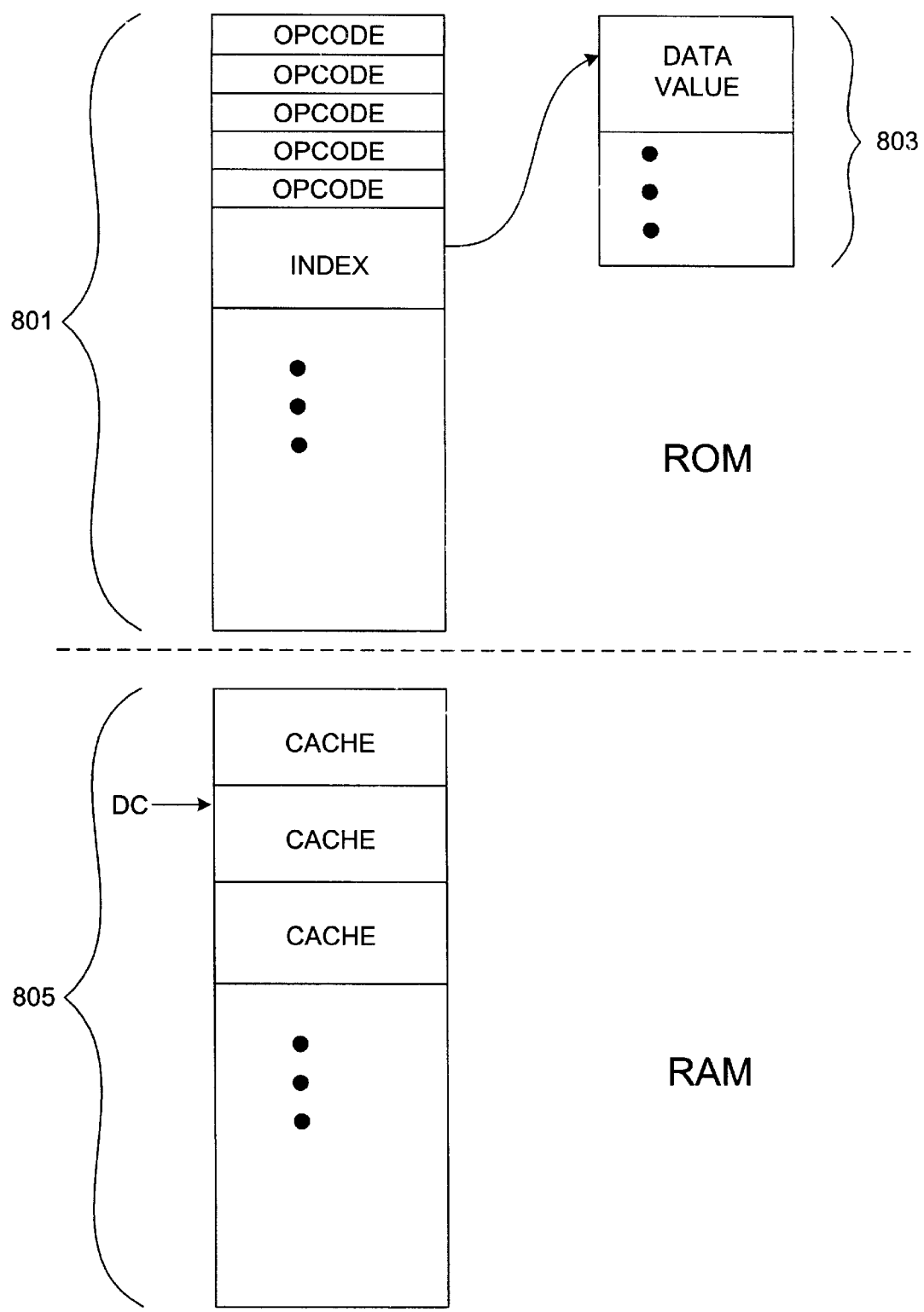
FIG. 15 shows an instruction section that is stored in read-only memory and a data section that is stored in random access memory.

FIG. 15 shows an instruction section and constant pool stored in read only memory (ROM) and a data section stored in random access memory (RAM). In some devices such as small hand held devices, the computer programs will be stored in a non-volatile memory such as ROM. The device will still typically have volatile memory to store data during execution of the program, such as RAM. In FIG. 15, an instruction section 801 and a constant pool 803 are stored in ROM whereas a data section 805 including cache information is stored in RAM. By utilizing a data section in RAM to store information such as cache information that is associated with instructions, the performance of the virtual machine may be increased without requiring a redesign of the virtual machine.

In other embodiments where the data section stores data values that are known at program initialization, the data values can be stored in ROM and copied to RAM during program initialization. It should be understood that the terms ROM and RAM have been used herein to generically refer to non-volatile memory and volatile memory, respectively.

While the above is a complete description of preferred embodiments of the invention, various alternatives, modifications, and equivalents can be used. It should be evident that the invention is equally applicable by making appropriate modifications to the embodiments described above. For example, the data section can be utilized to store various information that can be used by the computer system during program execution. Therefore, the above description should not be taken as limiting the scope of the invention that is defined by the metes and bounds of the appended claims along with their full scope of equivalents.

What is claimed is:

1. A method of executing instructions, comprising:

maintaining a program counter that specifies a current instruction in a instruction section for execution, the instruction section being a part of a computer memory;

maintaining a data counter that specifies a data location in a data section associated with current data used by the current instruction, wherein each data location includes data values, and further wherein at least some of the data values are of different lengths, the data section being included in the computer memory, wherein the data counter and the program counter can be incremented separately based upon whether or not the current instruction retrieved and used the current data;

executing the current instruction specified by the program counter;

determining if the current data at the data location specified by the data counter was retrieved and used during the execution of the current instruction specified by the program counter;

incrementing the program counter so as to specify a next instruction; and incrementing the data counter to a next data location as determined by the length of the data value used if the current data was retrieved and used during the execution of the current instruction.

2. The method of claim 1, wherein the data location includes cache information for use with the instruction.

3. The method of claim 2, wherein the instruction invokes a virtual function, and the cache information includes a class and a member function.

4. The method of claim 2, wherein the instruction invokes a JAVA™ virtual function, and the cache information includes a JAVA™ class and a JAVA™ member function.

5. The method of claim 1, wherein during execution, the instruction section is stored in read only memory (ROM) and the data section is stored in random access memory (RAM).

6. The method of claim 1, wherein the instruction is a virtual machine instruction.

7. The method of claim 1, wherein the instruction is a JAVA™ virtual machine instruction.

8. The method of claim 1, wherein the data counter specifies a data location in one of a plurality of data sections, each data sections storing data values of different lengths.

9. The method of claim 1, wherein the data counter specifies a data location in one of three data sections, the first data section having data values 32-bits long, the second data section having data values 64-bits long and the third data section having data values 128-bits long.

10. A computer program product that executes instructions, comprising:

computer code for maintaining a program counter that specifies a current instruction in a instruction section for execution, the instruction section being a part of a computer memory;

computer code for maintaining a data counter that specifies a data location in a data section associated with current data used by the current instruction, wherein each data location includes data values, and further wherein at least some of the data values are of different lengths, the data section being included in the computer memory, wherein the data counter and the program counter can be incremented separately based upon whether or not the current instruction retrieved and used the current data;

executing the current instruction specified by the program counter;

determining if the current data at the data location specified by the data counter was retrieved and used during the execution of the current instruction specified by the program counter;

incrementing the program counter so as to specify a next instruction; and incrementing the data counter to a next data location as determined by the length of the data value used if the current data was retrieved and used during the execution of the current instruction; and a computer readable medium that stores the computer codes.

11. The computer program product of claim 10, wherein the computer readable medium is selected from the group consisting of CD-ROM, floppy disk, tape, flash memory, system memory, hard drive, and data signal embodied in a carrier wave.

12. The computer program product of claim 10, wherein the current instruction is a virtual machine instruction.

13. The computer program of claim 10, wherein the data counter specifies a data location in one of a plurality of sections, each data section storing data values of different lengths.

14. The computer program of claim 10, wherein the data counter specifies a data location in one of three data sections, the first data section having data values 32-bits long, the second data section having data values 64-bits long and the third data section having data values 128-bits long.

* * * * *